(12) United States Patent
Bao et al.

(10) Patent No.: US 11,127,972 B2
(45) Date of Patent: Sep. 21, 2021

(54) BATTERY, METHOD FOR PREPARING THE SAME, APPLICATION METHOD, AND ELECTRONIC DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Huaxu Bao, Beijing (CN); Minghui Zhang, Beijing (CN); Wenxin Zhang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/634,379

(22) PCT Filed: Jul. 17, 2019

(86) PCT No.: PCT/CN2019/096310
§ 371 (c)(1),
(2) Date: Jan. 27, 2020

(87) PCT Pub. No.: WO2020/038159
PCT Pub. Date: Feb. 27, 2020

(65) Prior Publication Data
US 2021/0075052 A1 Mar. 11, 2021

(30) Foreign Application Priority Data
Aug. 22, 2018 (CN) .......................... 201810961987.1

(51) Int. Cl.
*H01M 10/04* (2006.01)
*H01M 50/538* (2021.01)
*H01M 10/44* (2006.01)

(52) U.S. Cl.
CPC ... *H01M 10/0445* (2013.01); *H01M 10/0472* (2013.01); *H01M 10/44* (2013.01); *H01M 50/538* (2021.01)

(58) Field of Classification Search
CPC ......... H01M 10/0445; H01M 10/0472; H01M 10/44; H01M 50/538
See application file for complete search history.

(56) References Cited

U.S. PATENT DOCUMENTS

| | | | |
|---|---|---|---|
| 2013/0323565 A1* | 12/2013 | Tucholski | H01M 10/365 429/127 |
| 2014/0342192 A1 | 11/2014 | Wang et al. | |
| 2017/0033359 A1 | 2/2017 | Ogumi et al. | |

FOREIGN PATENT DOCUMENTS

| | | |
|---|---|---|
| CN | 104025345 A | 9/2014 |
| CN | 104766994 A | 7/2015 |

(Continued)

OTHER PUBLICATIONS

Ko et al. Journal of Computational Design and Engineering, vol. 1, No. 2 (2014) 116-127.*

(Continued)

*Primary Examiner* — Olatunji A Godo
(74) *Attorney, Agent, or Firm* — Brooks Kushman P.C.

(57) ABSTRACT

The present disclosure relates to a battery, a method for preparing the same, an application method and an electronic device. The battery includes: a battery panel, in which the battery panel is capable of being switched between a first state and a second state, in the first state, the cation-transporting subunit is in contact with the ion-receiving subunit and one of the two ion-supplying subunits, and the anion-transporting subunit is in contact with the ion-receiving subunit and the other of the two ion-supplying subunits; in the second state, the cation-transporting subunit is not in contact with the ion-receiving subunit and one of the two (Continued)

ion-supplying subunits, and the anion-transporting subunit is not in contact with the ion-receiving subunit and the other of the two ion-supplying subunits.

20 Claims, 2 Drawing Sheets

(56) References Cited

FOREIGN PATENT DOCUMENTS

| CN | 105849967 A | 8/2016 |
|---|---|---|
| CN | 205810974 U | 12/2016 |
| CN | 109286337 A | 1/2019 |
| JP | 2016207631 A | 12/2016 |

OTHER PUBLICATIONS

First Office Action for Chinese Application No. 201810961987.1, dated Sep. 23, 2019, 5 Pages.
International Search Report and Written Opinion for Application No. PCT/CN2019/096310, dated Oct. 16, 2019, 11 Pages.

* cited by examiner

BATTERY, METHOD FOR PREPARING THE SAME, APPLICATION METHOD, AND ELECTRONIC DEVICE

CROSS-REFERENCE TO RELATED APPLICATIONS

This application is the U.S. national phase of PCT Application No. PCT/CN2019/096310 filed on Jul. 17, 2019, which claims priority to Chinese Patent Application No. 201810961987.1 filed on Aug. 22, 2018, which are incorporated herein by reference in their entireties.

TECHNICAL FIELD

The present disclosure relates to the technical field of battery, in particular, to a battery, a method for preparing the same, an application method of the battery, and an electronic device including the battery.

BACKGROUND

With the continuous improvement of the quality of people's lives, various electronic products are gradually applied to people's lives. In order to improve the practicality of electronic products, batteries are usually installed in electronic products to power the electronic products. However, most of the batteries in the prior art have complicated structures and large volumes; and sources of power generation are not readily available. Therefore, there is an urgent need to develop a battery with a new structure to overcome the above defects.

SUMMARY

In an aspect, the present disclosure provides a battery including a battery panel, in which the battery panel includes: a first substrate and a second substrate arranged opposite to each other; and at least one voltage-generating unit arranged between the first substrate and the second substrate, in which the voltage-generating unit includes: an ion-receiving subunit and two ion-supplying subunits arranged on first substrate and independent of each other; and a cation-transporting subunit and an anion-transporting subunit arranged on second substrate and independent of each other, in which an orthogonal projection of the cation-transporting subunit on the first substrate partially overlaps an orthogonal projection of the ion-receiving subunit on the first substrate and an orthogonal projection of one of the two ion-supplying subunits on the first substrate; and an orthogonal projection of the anion-transporting subunit on the first substrate partially overlaps an orthogonal projection of the ion-receiving subunit on the first substrate and an orthogonal projection of the other of the two ion-supplying subunits on the first substrate, respectively, in which the cation-transporting subunit is configured as a positive electrode of the voltage-generating unit, and the anion-transporting subunit is configured as a negative electrode of the voltage-generating unit, and in which the battery panel is capable of being switched between a first state and a second state, in the first state, the cation-transporting subunit is in contact with the ion-receiving subunit and one of the two ion-supplying subunits, and the anion-transporting subunit is in contact with the ion-receiving subunit and the other of the two ion-supplying subunits; in the second state, the cation-transporting subunit is not in contact with the ion-receiving subunit and one of the two ion-supplying subunits, and the anion-transporting subunit is not in contact with the ion-receiving subunit and the other of the two ion-supplying subunits.

Optionally, the battery panel includes a plurality of the voltage-generating units connected in series or in parallel.

Optionally, a plurality of the voltage-generating units is connected in series, and two adjacent voltage-generating units share one of the two ion-supplying subunits configured to provide cations for the ion-receiving subunit in one of the two adjacent voltage-generating units and to provide anions for the ion-receiving subunit in the other of the two adjacent voltage-generating units.

Optionally, the plurality of the voltage-generating units connected in series is arranged in an S shape between the first substrate and the second substrate.

Optionally, the first substrate and the second substrate are flexible substrates, and the ion-receiving subunit, the ion-supplying subunit, the cation-transporting subunit, and the anion-transporting subunit are all flexible.

Optionally, the first substrate and the second substrate are capable of being stacked by being folded along a set fold line, so that the battery has a multi-layered folded structure and one or more of the ion-receiving subunit, the two ion-supplying subunits, the cation-transporting subunit, and the anion-transporting subunit in the voltage-generating unit located at the set fold line are capable of being stretched by a bending force.

Optionally, the ion-receiving subunit includes a polyurethane hydrogel containing water, the ion-supplying subunit includes a polyurethane hydrogel containing sodium chloride, the cation-transporting subunit includes an acrylic hydrogel containing amino group, and the anion-transporting subunit includes an acrylic hydrogel containing carboxyl group.

Optionally, the battery includes a plurality of battery panels arranged in a stack and connected in series.

Optionally, at a connection between adjacent battery panels, a via hole is provided in the adjacent substrates of the adjacent battery panels, in the two voltage-generating units connected between the adjacent battery panels, a cation-transporting subunit in a voltage-generating unit of a battery panel located on an upper layer passes through the via hole and is connected to an anion-transporting subunit in a voltage-generating unit of a battery panel located on a lower layer; or, an anion-transporting subunit in a voltage-generating unit of a battery panel located on an upper layer passes through the via hole and is connected to a cation-transporting subunit in a voltage-generating unit of a battery panel located on a lower layer; or, a cation-transporting subunit in a voltage-generating unit of a battery panel located on a lower layer passes through the via hole and is connected to an anion-transporting subunit in a voltage-generating unit of a battery panel located on an upper layer; or, an anion-transporting subunit in a voltage-generating unit of a battery panel located on a lower layer passes through the via hole and is connected to a cation-transporting subunit in a voltage-generating unit of a battery panel located on an upper layer.

Optionally, in the adjacent battery panels, a first substrate or a second substrate of a battery panel located on an upper layer is also reused as a first substrate or a second substrate of a battery panel located on a lower layer.

Optionally, the battery further includes a charge control unit, the charge control unit being connected to a positive electrode and a negative electrode of the voltage-generating unit, for applying a charging voltage to the positive electrode and the negative electrode of the voltage-generating unit when the first substrate and the second substrate are in the first state.

In another aspect, the present disclosure provides an electronic device including the battery of any one of the above items.

In yet another aspect, the present disclosure provides a method for preparing the battery of any one of the above items, the method including: preparing a first substrate and a second substrate; preparing at least one set of first ion units on the first substrate, in which each of the at least one set of first ion units includes an ion-receiving subunit and two ion-supplying subunits independent of each other; preparing at least one set of second ion units on the second substrate, in which the at least one set of second ion units is in one-to-one correspondence with the at least one set of first ion units, and each of the at least one set of second ion units includes a cation-transporting subunit and anion-transporting subunit independent of each other; and arranging a first substrate having the at least one set of first ion units and a second substrate having the at least one set of second ion units to form a cell, so that the at least one set of first ion units and the at least one set of second ion units are both located between the first substrate and the second substrate.

Optionally, the step of preparing the first substrate and the second substrate includes: preparing the first substrate and/or the second substrate using a thermoplastic semi-crystalline polymer or a thermoplastic non-crystalline polymer by atomic layer deposition technology.

In yet another aspect, the present disclosure provides a method for applying the battery of any one of the above items, the method including: a discharge operation, for controlling the battery panel to be in the first state, so that the cation-transporting subunit in the voltage-generating unit is in contact with the ion-receiving subunit and one of the two ion-supplying subunits, and the anion-transporting subunit is in contact with the ion-receiving subunit and the other of the two ion-supplying subunits, thereby discharging through the cation-transporting subunit and the anion-transporting subunit.

Optionally, the battery further includes a charge control unit, and the method further includes: a charging operation, for controlling the battery panel to be in a first state, so that the voltage-generating unit is charged by applying a charging electric signal to a positive electrode and a negative electrode of the voltage-generating unit.

Optionally, the method further includes: stopping the discharge operation, for controlling the battery panel to be in a second state; or for controlling the battery panel to be in the first state, and disconnecting the battery from an electric device.

DETAILED DESCRIPTION

In order to further illustrate the battery, the method for preparing the same, the application method, and the electronic device provided by the embodiments of the present disclosure, the present disclosure will be described in detail hereinafter in conjunction with the drawings.

The batteries in the related art generally have problems such as complicated structures, large volumes, and difficulty in obtaining sources of power generation. Based on these technical problems in the related art, the inventors of the present disclosure have been inspired by the power generation principle of marine electric eel to complete the present invention. The power generation of electric eel comes from the power cells arranged in the body, in which each power cell can generate a weak voltage when power is needed, and can generate a very high voltage when many power cells are connected in series. Based on this power generation method, the inventors of the present disclosure have discovered through research that a plurality of small power-generating micro-elements (that is, subunits in the voltage-generating unit described below) can be prepared, a voltage is generated by the contact between the power generation micro-elements, and then the generated voltage is cumulated and exported, to achieve the generation of electrical energy that can be used to drive an electronic device.

According to an aspect of the present disclosure, the present disclosure provides a battery including a battery panel, in which the battery panel includes: a first substrate and a second substrate arranged opposite to each other; and at least one voltage-generating unit arranged between the first substrate and the second substrate, in which the voltage-generating unit includes: an ion-receiving subunit and two ion-supplying subunits arranged on first substrate and independent of each other; and a cation-transporting subunit and an anion-transporting subunit arranged on second substrate and independent of each other, in which an orthogonal projection of the cation-transporting subunit on the first substrate partially overlaps an orthogonal projection of the ion-receiving subunit on the first substrate and an orthogonal projection of one of the two ion-supplying subunits on the first substrate; and an orthogonal projection of the anion-transporting subunit on the first substrate partially overlaps an orthogonal projection of the ion-receiving subunit on the first substrate and an orthogonal projection of the other of the two ion-supplying subunits on the first substrate, respectively, in which the cation-transporting subunit is configured as a positive electrode of the voltage-generating unit, and the anion-transporting subunit is configured as a negative electrode of the voltage-generating unit, and in which the battery panel is capable of being switched between a first state and a second state, in the first state, the cation-transporting subunit is in contact with the ion-receiving subunit and one of the two ion-supplying subunits, and the anion-transporting subunit is in contact with the ion-receiving subunit and the other of the two ion-supplying subunits; in the second state, the cation-transporting subunit is not in contact with the ion-receiving subunit and one of the two ion-supplying subunits, and the anion-transporting subunit is not in contact with the ion-receiving subunit and the other of the two ion-supplying subunits.

The above-mentioned solution of the present disclosure can solve the problems of the batteries in the related art, such as complicated structures, large volumes, and difficulty in obtaining sources of power generation. In the battery provided by the present disclosure, the directional movements of cations and anions are controlled by controlling the mutual contact between the subunits in the voltage-generating unit, thereby generating a voltage capable of supplying power to an electric device. Moreover, the voltage-generating unit includes only a few subunits, and the voltage can be generated by controlling a fixed contact manner between the subunits, so that the battery provided by the present disclosure has a simple structure. In addition, since the sizes of the subunits in the voltage-generating unit can be set according to actual needs and can be as small as a few millimeters, the volume of the battery provided by the present disclosure is not limited, and thus the battery has a wider range of applications.

Figure 1:
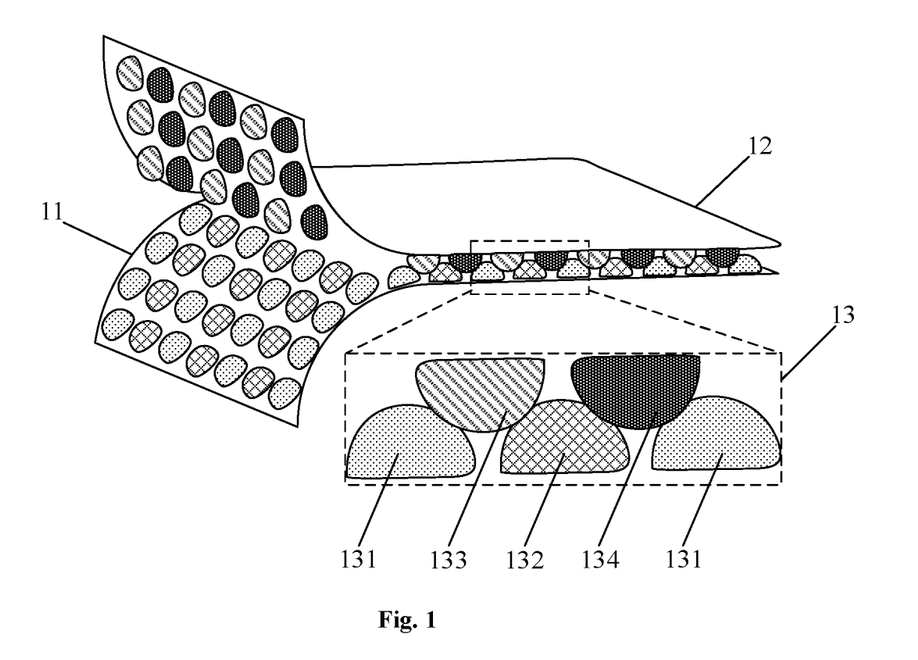
FIG. 1 is a schematic view showing a battery panel according to an embodiment of the present disclosure.

As shown in FIG. 1, a battery provided by an embodiment of the present disclosure includes a battery panel 1, and the battery panel 1 includes: a first substrate 11 and a second substrate 12 arranged opposite to each other; and at least one voltage-generating unit 13 arranged between the first substrate 11 and the second substrate 12, in which the voltage-generating unit 13 includes: an ion-receiving subunit 132 and two ion-supplying subunits 131 arranged on first substrate 11 and independent of each other; and a cation-transporting subunit 133 and an anion-transporting subunit 134 arranged on second substrate 12 and independent of each other. An orthogonal projection of the cation-transporting subunit 133 on the first substrate 11 partially overlaps an orthogonal projection of the ion-receiving subunit 132 on the first substrate 11 and an orthogonal projection of one of the two ion-supplying subunits 131 on the first substrate 11, respectively. An orthogonal projection of the anion-transporting subunit 134 on the first substrate 11 partially overlaps an orthogonal projection of the ion-receiving subunit 132 on the first substrate 11 and an orthogonal projection of the other of the two ion-supplying subunits 131 on the first substrate 11, respectively. The cation-transporting subunit 133 is configured as a positive electrode of the voltage-generating unit 13, and the anion-transporting subunit 134 is configured as a negative electrode of the voltage-generating unit 13.

The battery panel 1 is capable of being switched between a first state and a second state. In the first state, the cation-transporting subunit 133 is in contact with the corresponding ion-receiving subunit 132 and one of the two ion-supplying subunits 131, and the anion-transporting subunit 134 is in contact with the corresponding ion-receiving subunit 132 and the other of the two ion-supplying subunits 131. In the second state, the cation-transporting subunit 133 is not in contact with the corresponding ion-receiving subunit 132 and one of the two ion-supplying subunits 131, and the anion-transporting subunit 134 is not in contact with the corresponding ion-receiving subunit 132 and the other of the two ion-supplying subunits 131.

The working process of the above battery panel 1 is shown as follows.

In the first state, the first substrate 11 and the second substrate 12 in the battery panel 1 are closed, so that the cation-transporting subunit 133 in the voltage-generating unit 13 is in contact with the corresponding ion-receiving subunit 132 and one of the two ion-supplying subunits 131, and the anion-transporting subunit 134 is in contact with the corresponding ion-receiving subunit 132 and the other of the two ion-supplying subunits 131. Thus, the cations in one of the two ion-supplying subunits 131 are transferred to one side of the ion-receiving subunit 132 through the cation-transporting subunit 133, and the anions in the other of the two ion-supplying subunits 131 are transferred to the other side of the ion-receiving subunit 132 through the anion-transporting subunit 134, so that a potential difference is formed on both sides of the ion-receiving subunit 132, thereby generating a voltage capable of powering an external electrical device. This voltage can be exported from the electrodes of the voltage-generating unit 13. The electrodes of the voltage-generating unit 13 include a positive electrode (that is, a cation-transporting subunit 133) and a negative electrode (that is, an anion-transporting subunit 134). When the voltage generated by the voltage-generating unit 13 is exported, the electrodes generated by the voltage-generating unit 13 can be connected to a flexible printed circuit in the battery, thereby achieving the export of voltage.

In the second state, the first substrate 11 and the second substrate 12 in the battery panel 1 are separated, so that the cation-transporting subunit 133 in the voltage-generating unit 13 is not in contact with the corresponding ion-receiving subunit 132 and one of the two ion-supplying subunits 131, and the anion-transporting subunit 134 is not in contact with the corresponding ion-receiving subunit 132 and the other of the two ion-supplying subunits 131. Therefore, the cations in one of the two ion-supplying subunits 131 cannot be transferred to one side of the ion-receiving subunit 132 through the cation-transporting subunit 133, and the anions in the other of the two ion-supplying subunits 131 cannot be transferred to the other side of the ion-receiving subunit 132 through the anion-transporting subunit 134, either, so that it is impossible for the voltage-generating unit 13 to generate a voltage.

There is a difference in ion concentration between the two ion-supplying subunits 131 and the ion-receiving subunit 132. Therefore, when the cation-transporting subunit 133 is in contact with the corresponding ion-receiving subunit 132 and one of the two ion-supplying subunits 131, respectively, the cations in the one of the two ion-supplying subunits 131 are naturally transferred to the ion-receiving subunit 132 through the cation-transporting subunit 133; similarly, when the anion-transporting subunit 134 is in contact with the corresponding ion-receiving subunit 132 and the other of the two ion-supplying subunits 131, the anions in the other of the two ion-supplying subunits 131 are naturally transferred to the ion-receiving subunit 132 through the anion-transporting subunit 134. During the transport of ions, the electrons will flow in the opposite direction, thereby generating an electric current.

The above cation-transporting subunit 133 is capable of transferring only cations and the above anion-transporting subunit 134 is capable of transferring only anions, which are related to the internal structures of the cation-transporting subunit 133 and the anion-transporting subunit 134. The cation-transporting subunit 133 has a better affinity for cations, and is capable of providing an "ion channel" for the transport of cations. The anion-transporting subunit 134 has a better affinity for anions, and is capable of providing an "ion channel" for the transport of anions.

The above battery panel 1 may include one or more voltage-generating units 13, and each of the one or more voltage-generating units 13 is capable of generating a voltage independently. The sizes of the two ion-supplying subunits 131, the ion-receiving subunit 132, the cation-transporting subunit 133, and the anion-transporting subunit 134 included in each of the one or more voltage-generating unit 13 can be set according to actual needs, and can be a few millimeters.

As can be seen from the specific structure and working process of the above battery, the battery provided by the embodiment of the present disclosure includes a battery panel 1, including: a first substrate 11, a second substrate 12, and at least one voltage-generating unit 13 arranged between the first substrate 11 and the second substrate 12, in which the voltage-generating unit 13 includes a cation-transporting subunit 133, an anion-transporting subunit 134, an ion-receiving subunit 132, and two ion-supplying subunits 131.

When the first substrate 11 and the second substrate 12 are closed, the two ion-supplying subunits 131 can transfer cations and anions to the ion-receiving subunit 132 through the cation-transporting subunit 133 and the anion-transporting subunit 134, respectively. Thus, a potential difference is formed on both sides of the ion-receiving subunit 132, thereby generating a voltage. The voltage can be exported to an electric device through the cation-transporting subunit 133 and the anion-transporting subunit 134, thereby being capable of supplying power to the electric device. As can be seen, in the battery provided by the embodiment of the present disclosure, the directional movements of cations and anions are controlled by controlling the mutual contact between the subunits in the voltage-generating unit 13, thereby generating a voltage capable of supplying power to an electric device. The sources of the power generation thereof are readily available. Moreover, the voltage-generating unit 13 includes only a few subunits, and the voltage can be generated by controlling a fixed contact manner between the subunits, so that the battery provided by the embodiment of the present disclosure has a simple structure. In addition, since the sizes of the subunits in the voltage-generating unit 13 can be set according to actual needs, for example, it can be a few millimeters, the battery provided by the embodiment of the present disclosure is small in size, and thus the battery has a wider range of applications.

The battery provided by the embodiments of the present disclosure has a very wide range of applications, and can be specifically applied to devices, such as mobile phones, tablet computers, display screens, and robots.

When the battery panel 1 includes a plurality of voltage-generating units 13 in the battery provided by the above embodiment, the plurality of voltage-generating units 13 may be connected according to actual needs. For example, the plurality of voltage-generating units 13 are connected in series; or the plurality of voltage-generating units 13 are connected in parallel. Of course, a part of the plurality of voltage-generating units 13 may be first connected in series, and then connected in parallel with the remaining of the plurality of voltage-generating units 13; or, a part of the plurality of voltage-generating units 13 may be first connected in parallel, and then connected in series with the remaining of the plurality of voltage-generating units 13.

When the plurality of voltage-generating units 13 are connected in series, the positive electrode of one of the plurality of voltage-generating units 13 may be connected to the negative electrode of another of the plurality of voltage-generating units 13. When the plurality of voltage-generating units 13 are connected in parallel, the positive electrode of one of the plurality of voltage-generating units 13 may be connected to the positive electrode of another of the plurality of voltage-generating units 13, and the negative electrode of the one of the plurality of voltage-generating units 13 may be connected to the negative electrode of another of the plurality of voltage-generating units 13.

The specific connection manners of the plurality of voltage-generating units 13 may be determined by the voltage values generated according to actual needs, and details are not described herein again.

In some embodiments, when the plurality of voltage-generating units 13 are connected in series, two adjacent voltage-generating units 13 share one of the two ion-supplying subunits 131. The one of the two ion-supplying subunits 131 is configured to provide cations for the ion-receiving subunit 132 in one of the two adjacent voltage-generating units 13 and to provide anions for the ion-receiving subunit 132 in the other of the two adjacent voltage-generating units 13.

In the case that the battery is prepared in actual, the battery panel 1 includes a plurality of voltage-generating units 13 connected in series, two adjacent voltage-generating units 13 may be configured to share one of the two ion-supplying subunits 131. This configuration is equivalent to reducing the volume of each voltage-generating unit 13, thereby reducing the space occupied by each voltage-generating unit 13. Therefore, more voltage-generating units 13 can be arranged between the first substrate 11 and the second substrate 12 of the battery panel 1. Moreover, since the shared ion-supplying subunit 131 can provide cations for the ion-receiving subunit 132 in one of the two adjacent voltage-generating units 13 and provide anions for the ion-receiving subunit 132 in the other of the two adjacent voltage-generating unit 13, it is guaranteed that the ion-supplying subunits 131 is capable of providing sufficient cations and anions for each voltage-generating unit 13 that shares the ion-supplying subunits 131. The voltages generated by the voltage-generating units 13 are independent of each other and are not affected by each other.

Figure 2:
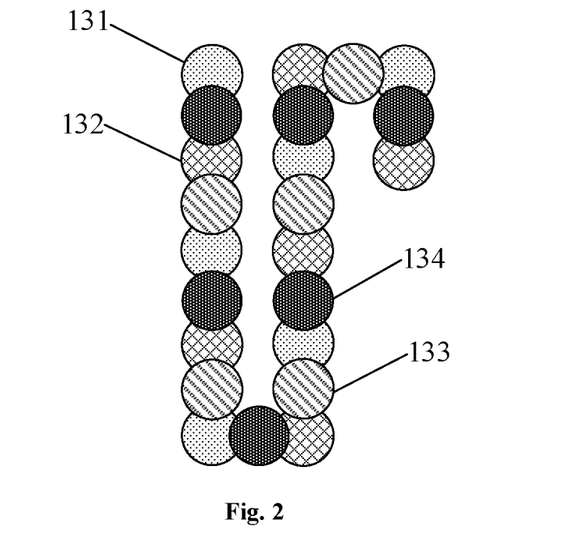
FIG. 2 is a schematic diagram of a voltage-generating unit arranged in an S shape according to an embodiment of the present disclosure.

In some embodiments, a plurality of voltage-generating units 13 connected in series may be arranged in an S shape between the first substrate 11 and the second substrate 12, as shown in FIG. 2.

Specifically, between the first substrate 11 and the second substrate 12, a plurality of voltage-generating units 13 connected in series are arranged in an S shape, and a plurality of voltage-generating units 13 may be arranged to be connected end to end. Adjacent voltage-generating units 13 shares one ion-supplying subunits 131, which not only enables the battery panel 1 to have a smaller volume, but also makes better use of the space between the first substrate 11 and the second substrate 12. Therefore, more voltage-generating units 13 can be arranged between the first substrate 11 and the second substrate 12.

Further, in the battery provided in the above embodiment, the first substrate 11 and the second substrate 12 included in the battery panel 1 may optionally be flexible substrates. The ion-receiving subunit 132, the two ion-supplying subunits 131, the cation-transporting subunit 133, and the anion-transporting subunit 134 included in the voltage-generating unit 13 in the battery panel 1 are flexible.

Specifically, the first substrate 11 and the second substrate 12 are configured as flexible substrates, and each subunit included in the voltage-generating unit 13 provided between the first substrate 11 and the second substrate 12 has flexibility, so that the entire battery panel 1 formed has flexibility. When such a battery panel 1 is actually applied, it can be bent according to the needs of the actual application, so that the battery has a wider range of applications. For example, the battery provided by the embodiments of the present disclosure can be applied to various flexible digital electronic products and medical products.

Figure 3:
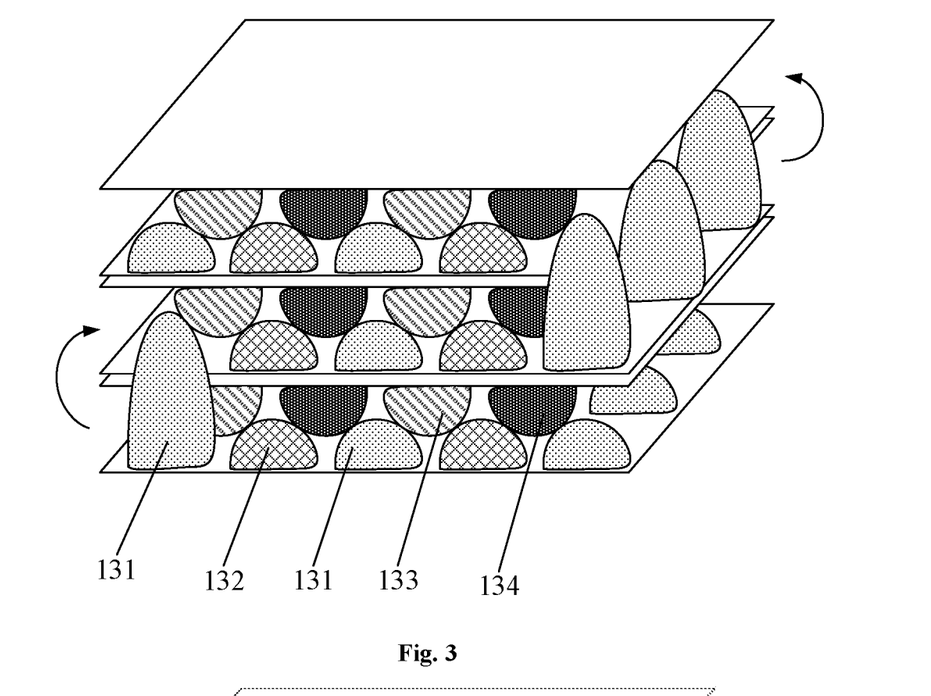
FIG. 3 is a schematic view of a battery panel with a folded structure according to an embodiment of the present disclosure.

In some embodiments, the first substrate 11 and the second substrate 12 are capable of being bent along a set fold line (as shown in FIG. 3 and bent in the direction of the arrow), so that the battery has a multi-layered folded structure and one or more of the ion-receiving subunit 132, the two ion-supplying subunits 131, the cation-transporting subunit 133, and the anion-transporting subunit 134 in the voltage-generating unit 13 located at the set fold line are capable of being stretched by a bending force.

Specifically, when the various subunits in the first substrate 11, the second substrate 12, and the voltage-generating unit 13 included in the above battery panel 1 are flexible, the battery panel 1 may be bent along a preset fold line to form a multi-layered folded structure. This effectively reduces the space occupied by the battery. Moreover, since each subunit included in the voltage-generating unit 13 has good flexibility, each subunit can be stretched by the bending force when the battery panel 1 is bent. This ensures that the subunits continue to maintain the original contact state therebetween, and that the folded battery can still achieve a good power supply performance.

Further, there are various types of the subunits included in the voltage-generating unit 13 provided in the above embodiment. For example, the above ion-receiving subunit 132 includes a polyurethane hydrogel, the ion-supplying subunits 131 includes a polyurethane hydrogel containing sodium chloride, the cation-transporting subunit 133 includes an acrylic hydrogel containing amino group, and the anion-transporting subunit 134 includes an acrylic hydrogel containing carboxyl group.

Specifically, when each subunits in the voltage-generating unit 13 is the above-mentioned hydrogels, in the first state, the acrylic hydrogel containing amino group is in contact with the corresponding polyurethane hydrogel and one polyurethane hydrogel containing sodium chloride, acrylic hydrogel containing carboxyl group is in contact with corresponding polyurethane hydrogel containing fresh water and another polyurethane hydrogel containing sodium chloride, so that the sodium ions in the one polyurethane hydrogel containing sodium chloride is transferred to one side of the polyurethane hydrogel through an acrylic hydrogel containing amino group, and the chloride ions in the another polyurethane hydrogel containing sodium chloride is transferred to the other side of the polyurethane hydrogel through an acrylic hydrogel containing carboxyl group, thereby forming a potential difference on both sides of the polyurethane hydrogel, and generating a voltage capable of supplying power to an external electrical device.

Since the hydrogel has good flexibility, when each subunit in the voltage-generating unit 13 is configured as the above-mentioned hydrogels, the voltage-generating unit 13 produced has good flexibility and is more conducive to the flexibility of the battery. In addition, the hydrogel has bioaffinity, and the voltage-generating unit 13 made of the hydrogel also has bioaffinity. Therefore, when including the above voltage-generating unit 13, the battery provided by the embodiment of the present disclosure is also suitable for being applied to the field of power supply of human body implant equipment.

Further, the battery provided in the above embodiment may include a plurality of battery panels 1 arranged in a stack and connected in series.

Specifically, the battery provided by the embodiment of the present disclosure may include one battery panel 1 or a plurality of battery panels 1. When the battery includes a plurality of battery panels 1, a plurality of battery panels 1 may be arranged in a stack and may be connected in series, thereby achieving a battery with a larger power supply capacity.

Figure 4:
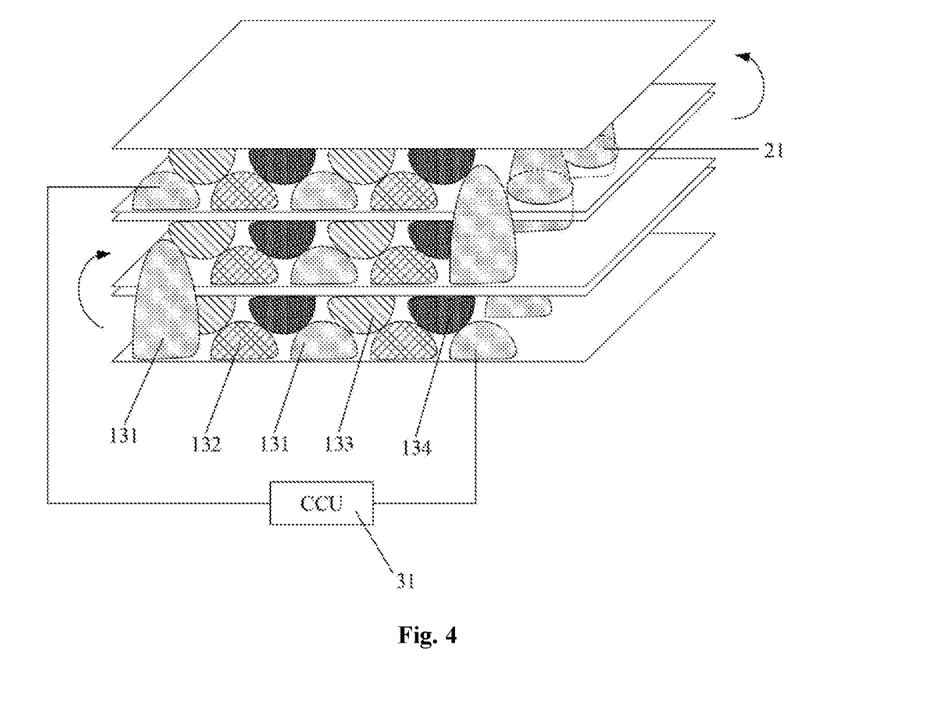
FIG. 4 is a schematic view of a battery panel with a folded structure in a state of being charged under controlling of according to an embodiment of the present disclosure.

When the battery provided in the above embodiment includes a plurality of battery panels 1 arranged in a stack and connected in series, the plurality of battery panels 1 may be connected in various ways. For example, as shown in FIG. 4, at a connection between adjacent battery panels 1, a via hole 21 can be provided in the adjacent substrates of the adjacent battery panels 1, and the plurality of battery panels 1 may be connected through the via hole 21. In two voltage-generating units 13 connected between the adjacent battery panels 1, a cation-transporting subunit 133 in a voltage-generating unit 13 of a battery panel 1 located on an upper layer passes through the via hole 21 and is connected to an anion-transporting subunit 134 in a voltage-generating unit 13 of a battery panel 1 located on a lower layer; or, an anion-transporting subunit 134 in a voltage-generating unit 13 of a battery panel 1 located on an upper layer passes through the via hole 21 and is connected to a cation-transporting subunit 133 in a voltage-generating unit 13 of a battery panel located 1 on a lower layer; or, a cation-transporting subunit 133 in a voltage-generating unit 13 of a battery panel 1 located on a lower layer passes through the via hole 21 and is connected to an anion-transporting subunit 134 in a voltage-generating unit 13 of a battery panel 1 located on an upper layer; or, an anion-transporting subunit 134 in a voltage-generating unit 13 of a battery panel 1 located on a lower layer passes through the via hole 21 and is connected to a cation-transporting subunit 133 in a voltage-generating unit 13 of a battery panel 1 located on an upper layer. Connecting the battery panels 1 in the battery according to the above-mentioned manner not only ensures the connection between the battery panels 1, but also does not need to add additional connecting wires, which simplifies the process for preparing the battery and reduces cost of production.

Further, when the battery provided in the above embodiment includes a plurality of battery panels 1 arranged in a stack and connected in series, in the adjacent battery panels 1, the second substrate 12 of the battery panel 1 located on the upper layer may be also reused as the first substrate 11 of the battery panel 1 on the lower layer; or the first substrate 11 of the battery panel 1 on the upper layer is also reused as the second substrate 12 of the battery panel 1 on the lower layer; or the first substrate 11 of the battery panel 1 on the upper layer is also reused as the first substrate 11 of the battery panel 1 located on the lower layer; or the second substrate 12 of the battery panel 1 on the upper layer is also reused as the second substrate 12 of the battery panel 1 on the lower layer.

Specifically, when the second substrate 12 of the battery panel 1 located on the upper layer is also reused as the first substrate 11 of the battery panel 1 located on the lower layer, or when the first substrate 11 of the battery panel 1 located on the upper layer is also reused as the second substrate 12 of the battery panel 1 on the lower layer, the ion-supplying subunits 131 and the ion-receiving subunit 132 belonging to one of the battery panels 1 can be produced on one side of the configured substrate, and the cation-transporting subunit 133 and the anion-transporting subunit 134 belonging to another of the battery panels 1 is produced on the other side of the configured substrate. When the first substrate 11 of the battery panel 1 located on the upper layer is also reused as the first substrate 11 of the battery panel 1 located on the lower layer, the ion-receiving subunit 132 and the ion-supplying subunits 131 belonging to the battery panel 1 located on the upper layer and the ion-receiving subunit 132 and the ion-supplying subunits 131 belonging to the battery panel 1 located on the lower layer can be produced on both sides of the configured first substrate 11, respectively. When the second substrate 12 of the battery panel 1 located on the upper layer is also reused as the second substrate 12 of the battery panel 1 located on the lower layer, the cation-transporting subunit 133 and the anion-transporting subunit 134 belonging to the battery panel 1 located on the upper layer and the cation-transporting subunit 133 and the anion-transporting subunit 134 belonging to the battery panel 1 located on the lower layer can be produced on both sides of the configured second substrate 12, respectively.

The above arrangement of sharing the same substrate between adjacent battery panels 1 not only effectively reduces the thickness of the battery and is more conducive to the thinning of the battery, but also saves the manufacturing cost of the battery.

Further, the battery provided in the above embodiment further includes a charge control unit. As shown in FIG. 4, the charge control unit (CCU) 31 is connected to the positive electrode (i.e., a head end of the voltage-generating units in series) of the voltage-generating unit 13 and the negative electrode (i.e., a last end of the voltage-generating units in series) of the voltage-generating unit 13, for applying a charging voltage to the positive electrode of the voltage-generating unit 13 and the negative electrode of the voltage-generating unit 13 when the first substrate 11 and the second substrate 12 are in the first state.

Specifically, the principle that the voltage-generating unit 13 generates a voltage is shown as follow: one of the two ion-supplying subunits 131 transfers cations to the ion-receiving subunit 132 through the cation-transporting subunit 133, and the other of the two ion-supplying subunits 131 transfers the anions to the ion-receiving subunit 132 through the anion-receiving subunit 134. Since ion flow causes electrons to flow in the opposite direction, thereby generating a current, a voltage is generated on both sides of the ion-receiving subunit 132.

During the voltage is generated by the voltage-generating unit 13, there is a difference in the ion concentration between the ion-supplying subunits 131 and the ion-receiving subunit 132, so that the ions flow from the ion-supplying subunits 131 to the ion-receiving subunit 132 through the transporting subunit. During this ion flow, the voltage-generating unit 13 generates a voltage. After the ion concentration between the ion-supplying subunits 131 and the ion-receiving subunit 132 is balanced, no more ions will flow from the ion-supplying subunits 131 to the ion-receiving subunit 132, which is equivalent to the situation that the power generated by the voltage generating unit 13 is exhausted.

After the power generated by the voltage-generating unit 13 is exhausted, the charge control unit 31 can be connected to the positive electrode of the voltage-generating unit 13 and the negative electrode of the voltage-generating unit 13, for applying a charging voltage to the positive electrode of the voltage-generating unit 13 and the negative electrode of the voltage-generating unit 13 by the charge control unit 31 when the first substrate 11 and the second substrate 12 are in the first state. The charging voltage enables the cations and anions transferred to the ion-receiving subunit 132 to be returned to the corresponding ion-supplying subunit 131 according to their respective transferring paths, and reforms a concentration difference between the ion-supplying subunits 131 and the ion-receiving subunit 132. That is, the charging process of the voltage-generating unit 13 is realized. After the power generated by the voltage-generating unit 13 is exhausted, the voltage-generating unit 13 may be recharged by the charge control unit 31, thereby implementing the repeated use of the battery provided by the embodiment of the present disclosure.

An embodiment of the present disclosure further provides an electronic device including the battery provided by any one of the above embodiments.

Since the battery provided by the above embodiment has the advantages, such as easy availability of sources of power generation, simple structure, small size, flexible bendability, thinness, simple manufacturing process, and low manufacturing cost, the electronic device provided by the embodiment of the present disclosure, when including the battery provided by the above embodiments, also has the above advantages, and details are not described herein again.

The embodiment of the present disclosure further provides a method for preparing the battery of any one of the above embodiments, the method including: preparing a first substrate 11 and a second substrate 12; preparing at least one set of first ion units on the first substrate 11, in which each of the at least one set of first ion units includes an ion-receiving subunit 132 and two ion-supplying subunits 131 independent of each other; preparing at least one set of second ion units on the second substrate 12, in which the at least one set of second ion units is in one-to-one correspondence with the at least one set of first ion units, and each of the at least one set of second ion units includes a cation-transporting subunit 133 and anion-transporting subunit 134 independent of each other; and arranging a first substrate 11 having the at least one set of first ion units and a second substrate 12 having the at least one set of second ion units to form a cell, so that the at least one set of first ion units and the at least one set of second ion units are both located between the first substrate 11 and the second substrate 12.

Among them, an orthogonal projection of the cation-transporting subunit 133 on the first substrate 11 partially overlaps an orthogonal projection of the ion-receiving subunit 132 on the first substrate 11 and an orthogonal projection of one of the two ion-supplying subunits 131 on the first substrate 11; and an orthogonal projection of the anion-transporting subunit 134 on the first substrate 11 partially overlaps an orthogonal projection of the ion-receiving subunit 132 on the first substrate 11 and an orthogonal projection of the other of the two ion-supplying subunits 131 on the first substrate 11, respectively; and a cation-transporting subunit 133 is configured as a positive electrode of the voltage-generating unit 13, and an anion-transporting subunit 134 is configured as a negative electrode of the voltage-generating unit 13.

Among them, the battery panel 1 is capable of being switched between a first state and a second state, in the first state, the cation-transporting subunit 133 is in contact with the ion-receiving subunit 132 and one of the two ion-supplying subunits 131, and the anion-transporting subunit 134 is in contact with the ion-receiving subunit 132 and the other of the two ion-supplying subunits 131; in the second state, the cation-transporting subunit 133 is not in contact with the ion-receiving subunit 132 and one of the two ion-supplying subunits 131, and the anion-transporting subunit 134 is not in contact with the ion-receiving subunit 132 and the other of the two ion-supplying subunits 131.

Specifically, the first substrate 11 and second substrate 12 prepared may optionally be flexible substrates. A polyurethane hydrogel containing sodium chloride and a polyurethane hydrogel not containing ions other than water can be prepared on the first substrate 11. The polyurethane hydrogel containing sodium chloride is used as the ion-supplying subunits 131, and the polyurethane hydrogel not containing ions other than water is used as the ion-receiving subunit 132. An acrylic hydrogel containing amino group and an acrylic hydrogel containing carboxyl group are prepared on the second substrate 12. The acrylic hydrogel containing amino group is used as the cation-transporting subunit 133, and the acrylic hydrogel containing carboxyl group is used as the anion-transporting subunit 134. In the embodiment of the present disclosure, dimples are first prepared on a flexible substrate according to a set pattern, then a hydrogel block is formed in each dimple using mold infusion, and finally the mold is removed to prepare an ion-supplying subunit, an ion-receiving subunit, and an ion-transporting subunit.

After the first substrate 11, the second substrate 12, and the subunits located on each substrate are completed, the first substrate 11 and the second substrate 12 may be arranged to form a cell, so that the subunits on each substrate are located between the first substrate 11 and the second substrate 12. After the first substrate 11 and the second substrate 12 are arranged to form a cell, the battery panel 1 can be switched between the first state and the second state. The first state is that the first substrate 11 and the second substrate 12 are closed, that is, the cation-transporting subunit 133 is in contact with the corresponding ion-receiving subunit 132 and one of the two ion-supplying subunits 131, respectively, and the anion-transporting subunit 134 is in contact with the corresponding ion-receiving subunit 132 and the other of the two ion-supplying subunits 131, respectively. The second state is that the first substrate 11 and the second substrate 12 are separated, that is, the cation-transporting subunit 133 is not in contact with the corresponding ion-receiving subunit 132 and one of the two ion-supplying subunits 131, and the anion-transporting subunit 134 is not in contact with the corresponding ion-receiving subunit 132 and the other of the two ion-supplying subunits 131. The above hydrogels as different subunits can be made into a bump shape with a certain thickness, but it is not limited to this.

The working process of the battery prepared by the method provided by the embodiment of the present disclosure has been described in detail in the above structural section, and details are not described herein again.

In the battery prepared by the method provided by the embodiment of the present disclosure, the directional movements of cations and anions are controlled by controlling the mutual contact between the subunits in the voltage-generating unit 13, thereby generating a voltage capable of supplying power to an electric device. The sources of the power generation are readily available. Moreover, the voltage-generating unit 13 includes only a few subunits, and the voltage can be generated by controlling a fixed contact manner between the subunits, so that the battery provided by the preparation method provided by the embodiment of the present disclosure has a simple structure. In addition, since the sizes of the subunits in the voltage-generating unit 13 can be set according to actual needs, for example, it can be as small as a few millimeters, the volume of the battery prepared by the method provided by the embodiment of the present disclosure is not limited, and thus the battery has a wider range of applications.

Optionally, there are various methods for preparing the first substrate 11 and the second substrate 12. For example, the step of preparing the first substrate 11 and the second substrate 12 may specifically include: depositing a SiNx ($0<x<1$) film on a thermoplastic semi-crystalline polymer or a thermoplastic non-crystalline polymer substrate by atomic layer deposition technique, to block water vapor from entering the components and to increase the adhesion of the flexible substrate to the hydrogel.

In more detail, a thermoplastic semi-crystalline polymer such as polyethylene naphthalate (PEN) can be used as the flexible substrate, and a layer of SiNx ($0<x<1$) film can be deposited by roll-to-roll atomic layer deposition technique, to prepare the first substrate 11 and/or the second substrate 12. Since PEN has a good thermal expansion coefficient, good water and oxygen barrier properties, and flexibility and bendability, the substrate prepared by PEN also has good thermal expansion coefficient and good water and oxygen barrier properties and flexibility. Optionally, a non-crystalline thermoplastic polymer such as polycarbonate (PC) is used as the flexible substrate, and a layer of SiNx ($0<x<1$) film is deposited by atomic layer deposition, to prepare the first substrate 11 and/or the second substrate 12.

In the battery prepared by the method provided by the embodiment of the present disclosure, the battery panel 1 may include a plurality of voltage-generating units 13. The plurality of voltage-generating units 13 are connected in series, or the plurality of voltage-generating units 13 are connected in parallel.

Further, in the battery prepared by the method provided by the embodiment of the present disclosure, when a plurality of voltage-generating units 13 are connected in series, two adjacent voltage-generating units 13 share one of the two ion-supplying subunits 131, in which the one of the two ion-supplying subunits 131 is configured to provide cations for the ion-receiving subunit 132 in one of the two adjacent voltage-generating units 13 and to provide anions for the ion-receiving subunit 132 in the other of the two adjacent voltage-generating units 13.

Further, in the battery prepared by the method provided by the embodiment of the present disclosure, a plurality of voltage-generating units 13 connected in series are arranged in an S shape between the first substrate 11 and the second substrate 12.

Further, in the battery prepared by the method provided by the embodiment of the present disclosure, the first substrate 11 and the second substrate 12 are flexible substrates. The ion generation subunit 132, the two ion-supplying subunits 131, the cation-transporting subunit 133, and the anion-transporting subunit 134 are flexible.

Further, in the battery prepared by the method according to the embodiment of the present disclosure, the first substrate 11 and the second substrate 12 are capable of being bent along a set fold line, so that the battery has a multi-layered folded structure and one or more of the ion-receiving subunit 132, the two ion-supplying subunits 131, the cation-transporting subunit 133, and the anion-transporting subunit 134 in the voltage-generating unit 13 located at the set fold line are capable of being stretched by a bending force.

Further, the battery prepared by the method according to the embodiment of the present disclosure includes a plurality of battery panels 1 arranged in a stack and connected in series.

Further, in a battery prepared by the method according to the embodiment of the present disclosure, a via hole 21 is provided in the adjacent substrate of the adjacent battery panels 1 at a connection between the adjacent battery panels 1; in two voltage-generating units 13 connected between the adjacent battery panels 1, a cation-transporting subunit 133 in a voltage-generating unit 13 of a battery panel 1 located on an upper layer passes through the via hole 21 and is connected to an anion-transporting subunit 134 in a voltage-generating unit 13 of a battery panel 1 located on a lower layer; or, an anion-transporting subunit 134 in a voltage-generating unit 13 of a battery panel 1 located on an upper layer passes through the via hole 21 and is connected to a cation-transporting subunit 133 in a voltage-generating unit 13 of a battery panel located 1 on a lower layer; or, a cation-transporting subunit 133 in a voltage-generating unit 13 of a battery panel 1 located on a lower layer passes through the via hole 21 and is connected to an anion-transporting subunit 134 in a voltage-generating unit 13 of a battery panel 1 located on an upper layer; or, an anion-transporting subunit 134 in a voltage-generating unit 13 of a battery panel 1 located on a lower layer passes through the via hole 21 and is connected to a cation-transporting subunit 133 in a voltage-generating unit 13 of a battery panel 1 located on an upper layer.

Further, in the battery prepared by the method according to the embodiment of the present disclosure, in the adjacent battery panels 1, the second substrate 12 of the battery panel 1 located on the upper layer may be also reused as the first substrate 11 of the battery panel 1 on the lower layer; or the first substrate 11 of the battery panel 1 on the upper layer is also reused as the second substrate 12 of the battery panel 1 on the lower layer; or the first substrate 11 of the battery panel 1 on the upper layer is also reused as the first substrate 11 of the battery panel 1 located on the lower layer; or the second substrate 12 of the battery panel 1 on the upper layer is also reused as the second substrate 12 of the battery panel 1 on the lower layer.

Further, in the battery prepared by the method according to the embodiment of the present disclosure, the battery further includes a charge control unit 31. The charge control unit 31 is connected to the positive electrode and the negative electrode of the voltage-generating unit 13, for applying a charging voltage to the positive electrode of the voltage-generating unit 13 and the negative electrode of the voltage-generating unit 13 when the first substrate 11 and the second substrate 12 are in the first state.

An embodiment of the present disclosure further provides a method for applying the battery provided in the above embodiments, the method including: a discharging operation, for controlling the battery panel 1 to be in the first state, so that the cation-transporting subunit 133 in the voltage-generating unit 13 is in contact with the corresponding ion-receiving subunit 132 and one of the two ion-supplying subunits 131, and the anion-transporting subunit 134 in the voltage-generating unit 13 is in contact with the corresponding ion-receiving subunit 132 and the other of the two ion-supplying subunits 131, thereby discharging through the cation-transporting subunit 133 and the anion-transporting subunit 134.

Specifically, the first substrate 11 and the second substrate 12 in the battery panel 1 are controlled to be closed, so that the battery panel 1 is in the first state, the cation-transporting subunit 133 in the voltage-generating unit 13 is in contact with the corresponding ion-receiving subunit 132 and one of the two ion-supplying subunits 131, and the anion-transporting subunit 134 is in contact with the corresponding ion-receiving subunit 132 and the other of the two ion-supplying subunits 131. Thus, the cations in one of the two ion-supplying subunits 131 are transferred to one side of the ion-receiving subunit 132 through the cation-transporting subunit 133, and the anions in the other of the two ion-supplying subunits 131 are transferred to the other side of the ion-receiving subunit 132 through the anion-transporting subunit 134, so that a potential difference is formed on both sides of the ion-receiving subunit 132, thereby generating a voltage capable of powering an external electrical device. This voltage can be exported from the electrodes of the voltage-generating unit 13.

In the method for applying the battery provided by the embodiment of the present disclosure, the directional movements of cations and anions can be controlled by controlling the mutual contact between the subunits in the voltage-generating unit 13, thereby generating a voltage capable of supplying power to an electric device. The sources of the power generation thereof are readily available. In addition, the battery application method provided by the embodiments of the present disclosure can realize the voltage generation by controlling a fixed contact manner between the subunits, and the operation is simple and convenient.

Further, when the battery provided in the above embodiment further includes a charge control unit 31, the application method provided by the embodiment of the present disclosure further includes: a charging operation, when the battery panel 1 is in the first state, a charging voltage is applied to the positive electrode of the voltage-generating unit 13 and the negative electrode of the voltage-generating unit 13 to charge the voltage-generating unit 13.

Specifically, the principle that the voltage-generating unit 13 generates a voltage is shown as follow: one of the two ion-supplying subunits 131 transfers cations to the ion-receiving subunit 132 through the cation-transporting subunit 133, and the other of the two ion-supplying subunits 131 transfers the anions to the ion-receiving subunit 132 through the anion-receiving subunit 134. Since ion flow causes electrons to flow in the opposite direction, thereby generating a current, a voltage is generated on both sides of the ion-receiving subunit 132.

During the voltage is generated by the voltage-generating unit 13, there is a difference in the ion concentration between the ion-supplying subunits 131 and the ion-receiving subunit 132, so that the ions flow from the ion-supplying subunits 131 to the ion-receiving subunit 132 through the transporting subunit. During this ion flow, the voltage-generating unit 13 generates a voltage. After the ion concentration between the ion-supplying subunits 131 and the ion-receiving subunit 132 is balanced, no more ions will flow from the ion-supplying subunits 131 to the ion-receiving subunit 132, which is equivalent to the situation that the power generated by the voltage generating unit 13 is exhausted.

After the power generated by the voltage-generating unit 13 is exhausted, the battery can be charged. Specifically, the charge control unit 31 may be connected to the positive electrode of the voltage-generating unit 13 and the negative electrode of the voltage-generating unit 13, for applying a charging voltage to the positive electrode of the voltage-generating unit 13 and the negative electrode of the voltage-generating unit 13 by the charge control unit 31 when the first substrate 11 and the second substrate 12 are in the first state. The charging voltage enables the cations and anions transferred to the ion-receiving subunit 132 to be returned to the corresponding ion-supplying subunit 131 according to their respective transferring paths, and reforms a concentration difference between the ion-supplying subunits 131 and the ion-receiving subunit 132, thereby realizing the charging process of the voltage-generating unit 13.

As can be seen, in the battery application method provided by the embodiment of the present disclosure, after the power generated by the voltage generating unit 13 is exhausted, the voltage-generating unit 13 may be recharged by the charge control unit, thereby implementing the repeated use of the battery.

Further, the application method provided by the above embodiment further includes: stopping the discharge operation, for controlling the battery panel 1 to be in a second state; or for controlling the battery panel 1 to be in the first state, and disconnecting the battery from an electric device.

Specifically, in the process of actually applying the battery, it is necessary to control the battery to stop supplying power to the electric device. There are many manners to control the battery to stop supplying power to the electric device. For example, the battery panel 1 is controlled to be in the second state; or the battery panel 1 is controlled to be in the first state, and disconnecting the battery from an electric device.

In more detail, as for the manner of controlling the battery panel 1 in the second state, the first substrate 11 and the second substrate 12 in the battery panel 1 can be controlled to be separated, so that the cation-transporting subunit 133 in the voltage-generating unit 13 is not in contact with the corresponding ion-receiving subunit 132 and one of the two ion-supplying subunits 131, and the anion-transporting subunit 134 is in not contact with the corresponding ion-receiving subunit 132 and the other of the two ion-supplying subunits 131. Thus, the cations in one of the two ion-supplying subunits 131 cannot be transferred to one side of the ion-receiving subunit 132 through the cation-transporting subunit 133, and the anions in the other of the two ion-supplying subunits 131 cannot be transferred to the other side of the ion-receiving subunit 132 through the anion-transporting subunit 134, either, so that the voltage generating unit 13 cannot generate a voltage.

As for the manner of controlling the battery panel 1 in the first state and disconnecting the battery from the electric device, the disconnection is to disconnect the battery from the electric device (load), so that the electric device does not consume power.

Unless otherwise defined, technical terms or scientific terms used herein have the normal meaning commonly understood by one skilled in the art in the field of the present disclosure. The words "first", "second", and the like used in the present disclosure does not denote any order, quantity, or importance, but rather merely serves to distinguish different components. The "including", "comprising", and the like used in the present disclosure means that the element or item appeared in front of the word encompasses the element or item and their equivalents listed after the word, and does exclude other elements or items. The word "connected" or "connecting" and the like are not limited to physical or mechanical connections, but may include electrical connections, whether direct or indirect. It will be understood that "on", "under", "left", "right", etc. are only used to indicate relative positional relationships; when an element, such as a layer, film, region, or substrate, is referred to as being "on" or "under" another element, the element may be directly "on" or "under" another element, or there may be an intermediate element.

In the description of the above embodiments, the specific features, structures, materials or features may be combined in any suitable manner in any one or more embodiments or examples.

The above description is merely the specific embodiment of the present disclosure, but the scope of the present disclosure is not limited thereto. Moreover, any person skilled in the art would readily conceive of modifications or substitutions within the technical scope of the present disclosure, and these modifications or substitutions shall also fall within the protection scope of the present disclosure. Therefore, the protection scope of the present disclosure should be determined by the scope of the claims.

What is claimed is:

1. A battery comprising a battery panel, wherein the battery panel comprises:
    a first substrate and a second substrate arranged opposite to each other; and
    at least one voltage-generating unit arranged between the first substrate and the second substrate,
    wherein the voltage-generating unit comprises: an ion-receiving subunit and two ion-supplying subunits arranged on first substrate and independent of each other; and a cation-transporting subunit and an anion-transporting subunit arranged on second substrate and independent of each other,
    wherein an orthogonal projection of the cation-transporting subunit onto the first substrate partially overlaps an orthogonal projection of the ion-receiving subunit on the first substrate and an orthogonal projection of one of the two ion-supplying subunits on the first substrate; and an orthogonal projection of the anion-transporting subunit onto the first substrate partially overlaps an orthogonal projection of the ion-receiving subunit on the first substrate and an orthogonal projection of the other of the two ion-supplying subunits on the first substrate, respectively,
    wherein the cation-transporting subunit is configured as a positive electrode of the voltage-generating unit, and the anion-transporting subunit is configured as a negative electrode of the voltage-generating unit,
    wherein the battery panel is capable of being switched between a first state and a second state, in the first state, the cation-transporting subunit is in contact with the ion-receiving subunit and one of the two ion-supplying subunits, and the anion-transporting subunit is in contact with the ion-receiving subunit and the other of the two ion-supplying subunits; in the second state, the cation-transporting subunit is not in contact with the ion-receiving subunit and one of the two ion-supplying subunits, and the anion-transporting subunit is not in contact with the ion-receiving subunit and the other of the two ion-supplying subunits, and
    wherein the battery panel comprises a plurality of the voltage-generating units connected in series, and two adjacent voltage-generating units share one of the two ion-supplying subunits configured to provide cations for the ion-receiving subunit in one of the two adjacent voltage-generating units and to provide anions for the ion-receiving subunit in the other of the two adjacent voltage-generating units.

2. The battery of claim 1, wherein the plurality of the voltage-generating units connected in series is arranged in an S shape between the first substrate and the second substrate.

3. The battery of claim 1, wherein the first substrate and the second substrate are flexible substrates, and the ion-receiving subunit, the ion-supplying subunit, the cation-transporting subunit, and the anion-transporting subunit are all flexible.

4. The battery of claim 3, wherein the first substrate and the second substrate are capable of being stacked by being folded along a set fold line, so that the battery has a multi-layered folded structure, and one or more of the ion-receiving subunit, the two ion-supplying subunits, the cation-transporting subunit, and the anion-transporting subunit in the voltage-generating unit located at the set fold line are capable of being stretched by a bending force.

5. The battery of claim 3, wherein the ion-receiving subunit comprises a polyurethane hydrogel, the ion-supplying subunit comprises a polyurethane hydrogel containing sodium chloride, the cation-transporting subunit comprises an acrylic hydrogel containing amino group, and the anion-transporting subunit comprises an acrylic hydrogel containing carboxyl group.

6. The battery of claim 1, wherein the battery comprises a plurality of battery panels arranged in a stack and connected in series.

7. The battery of claim 5, wherein at a connection between adjacent battery panels, a via hole is provided in the adjacent substrates of the adjacent battery panels, in the two voltage-generating units connected between the adjacent battery panels, a cation-transporting subunit in a voltage-generating unit of a battery panel located on an upper layer passes through the via hole and is connected to an anion-transporting subunit in a voltage-generating unit of a battery panel located on a lower layer;

or, an anion-transporting subunit in a voltage-generating unit of a battery panel located on an upper layer passes through the via hole and is connected to a cation-transporting subunit in a voltage-generating unit of a battery panel located on a lower layer;

or, a cation-transporting subunit in a voltage-generating unit of a battery panel located on a lower layer passes through the via hole and is connected to an anion-transporting subunit in a voltage-generating unit of a battery panel located on an upper layer;

or, an anion-transporting subunit in a voltage-generating unit of a battery panel located on a lower layer passes through the via hole and is connected to a cation-transporting subunit in a voltage-generating unit of a battery panel located on an upper layer.

8. The battery of claim 6, wherein in the adjacent battery panels, a first substrate or a second substrate of a battery panel located on an upper layer is also reused as a first substrate or a second substrate of a battery panel located on a lower layer.

9. The battery of claim 1, wherein the battery further comprises a charge control unit, the charge control unit being connected to a positive electrode and a negative electrode of the voltage-generating unit, for applying a charging voltage to the positive electrode and the negative electrode of the voltage-generating unit when the first substrate and the second substrate are in the first state.

10. An electronic device comprising the battery of claim 1.

11. A method for preparing the battery of claim 1, comprising:

preparing a first substrate and a second substrate;

preparing at least one set of first ion units on the first substrate, wherein each of the at least one set of first ion units comprises an ion-receiving subunit and two ion-supplying subunits independent of each other;

preparing at least one set of second ion units on the second substrate, wherein the at least one set of second ion units is in one-to-one correspondence with the at least one set of first ion units, and each of the at least one set of second ion units comprises a cation-transporting subunit and anion-transporting subunit independent of each other; and arranging the first substrate having the at least one set of first ion units and the second substrate having the at least one set of second ion units to form a cell, so that the at least one set of first ion units and the at least one set of second ion units are both located between the first substrate and the second substrate.

12. The method of claim 11, wherein the step of preparing the first substrate and the second substrate comprises:

depositing a silicon nitride film on a flexible substrate of a thermoplastic semi-crystalline polymer or a thermoplastic non-crystalline polymer by atomic layer deposition technology.

13. The method of claim 11, wherein the at least one set of first ion units and the at least one set of second ion units are prepared by respectively providing a plurality of dimples in the first flexible substrate and second flexible substrate and by forming a hydrogel block in each of the plurality of dimples using mold infusion.

14. A method for applying the battery of claim 1, comprising:

a discharge operation, for controlling the battery panel to be in the first state, so that the cation-transporting subunit in the voltage-generating unit is in contact with the ion-receiving subunit and one of the two ion-supplying subunits, and the anion-transporting subunit is in contact with the ion-receiving subunit and the other of the two ion-supplying subunits, thereby discharging through the cation-transporting subunit and the anion-transporting subunit.

15. The method of claim 14, wherein the battery further comprises a charge control unit, and the method further comprises:

a charging operation, for controlling the battery panel to be in a first state, so that the voltage-generating unit is charged by applying a voltage to a positive electrode and a negative electrode of the voltage-generating unit through the charge control unit.

16. The method of claim 14, wherein the method further comprises:

stopping the discharge operation, for controlling the battery panel to be in a second state; or for controlling the battery panel to be in the first state, and disconnecting the battery from an electric device.

17. The electronic device of claim 10, wherein the battery comprises a plurality of battery panels arranged in a stack and connected in series.

18. A method for preparing a battery comprising a battery panel, wherein the battery panel comprises a first substrate and a second substrate arranged opposite to each other; and at least one voltage-generating unit arranged between the first substrate and the second substrate, wherein the voltage-generating unit comprises: an ion-receiving subunit and two ion-supplying subunits arranged on first substrate and independent of each other; and a cation-transporting subunit and an anion-transporting subunit arranged on second substrate and independent of each other, wherein an orthogonal projection of the cation-transporting subunit onto the first substrate partially overlaps an orthogonal projection of the ion-receiving subunit on the first substrate and an orthogonal projection of one of the two ion-supplying subunits on the first substrate; and an orthogonal projection of the anion-transporting subunit onto the first substrate partially overlaps an orthogonal projection of the ion-receiving subunit on the first substrate and an orthogonal projection of the other of the two ion-supplying subunits on the first substrate, respectively, wherein the cation-transporting subunit is configured as a positive electrode of the voltage-generating unit, and the anion-transporting subunit is configured as a negative electrode of the voltage-generating unit, and wherein the battery panel is capable of being switched between a first state and a second state, in the first state, the cation-transporting subunit is in contact with the ion-receiving subunit and one of the two ion-supplying subunits, and the anion-transporting subunit is in contact with the ion-receiving subunit and the other of the two ion-supplying subunits; in the second state, the cation-transporting subunit is not in contact with the ion-receiving subunit and one of the two ion-supplying subunits, and the anion-transporting subunit is not in contact with the ion-receiving subunit and the other of the two ion-supplying subunits, the method comprising:

preparing a first substrate and a second substrate;

preparing at least one set of first ion units on the first substrate, wherein each of the at least one set of first ion units comprises an ion-receiving subunit and two ion-supplying subunits independent of each other;

preparing at least one set of second ion units on the second substrate, wherein the at least one set of second ion units is in one-to-one correspondence with the at least one set of first ion units, and each of the at least one set of second ion units comprises a cation-transporting subunit and anion-transporting subunit independent of each other; and arranging the first substrate having the at least one set of first ion units and the second substrate having the at least one set of second ion units to form a cell, so that the at least one set of first ion units and the at least one set of second ion units are both located between the first substrate and the second substrate, wherein the step of preparing the first substrate and the second substrate comprises: depositing a silicon nitride film on a flexible substrate of a thermoplastic semi-crystalline polymer or a thermoplastic non-crystalline polymer by atomic layer deposition technology.

19. A battery comprising a battery panel, wherein the battery panel comprises a first substrate and a second substrate arranged opposite to each other; and at least one voltage-generating unit arranged between the first substrate and the second substrate, wherein the voltage-generating unit comprises: an ion-receiving subunit and two ion-supplying subunits arranged on first substrate and independent of each other; and a cation-transporting subunit and an anion-transporting subunit arranged on second substrate and independent of each other, wherein an orthogonal projection of the cation-transporting subunit onto the first substrate partially overlaps an orthogonal projection of the ion-receiving subunit on the first substrate and an orthogonal projection of one of the two ion-supplying subunits on the first substrate; and an orthogonal projection of the anion-transporting subunit onto the first substrate partially overlaps an orthogonal projection of the ion-receiving subunit on the first substrate and an orthogonal projection of the other of the two ion-supplying subunits on the first substrate, respectively, wherein the cation-transporting subunit is configured as a positive electrode of the voltage-generating unit, and the anion-transporting subunit is configured as a negative electrode of the voltage-generating unit, wherein the battery panel is capable of being switched between a first state and a second state, in the first state, the cation-transporting subunit is in contact with the ion-receiving subunit and one of the two ion-supplying subunits, and the anion-transporting subunit is in contact with the ion-receiving subunit and the other of the two ion-supplying subunits; in the second state, the cation-transporting subunit is not in contact with the ion-receiving subunit and one of the two ion-supplying subunits, and the anion-transporting subunit is not in contact with the ion-receiving subunit and the other of the two ion-supplying subunits, and wherein the battery further comprises a charge control unit, the charge control unit being connected to a positive electrode and a negative electrode of the voltage-generating unit, for applying a charging voltage to the positive electrode and the negative electrode of the voltage-generating unit when the first substrate and the second substrate are in the first state.

20. The battery of claim 19, wherein the battery panel comprises a plurality of the voltage-generating units connected in parallel.

\* \* \* \* \*